United States Patent [19]

Gavrun et al.

[11] 3,978,826

[45] Sept. 7, 1976

[54] ROTARY ENGINE WITH INTAKE VALVE HAVING A VARIABLE OPEN PERIOD FOR POWER CONTROL

[75] Inventors: Michael T. Gavrun, Bayonne; Robert W. Loyd, Jr., Wyckoff, both of N.J.

[73] Assignee: Curtiss-Wright Corporation, Wood-Ridge, N.J.

[22] Filed: Apr. 14, 1975

[21] Appl. No.: 568,124

[52] U.S. Cl. ............................ 123/8.45; 123/90.12; 123/90.15; 123/90.24
[51] Int. Cl.² .......................................... F02B 53/06
[58] Field of Search ............. 123/8.45, 90.12, 90.11, 123/90.14, 90.15, 90.24; 137/624.13, 624.15, 624.18, 624.2

[56] References Cited
UNITED STATES PATENTS

| | | | |
|---|---|---|---|
| 2,602,434 | 7/1952 | Barnaby | 123/90.12 |
| 3,683,874 | 8/1972 | Berlyn | 123/90.12 |
| 3,727,595 | 4/1973 | Links | 123/90.12 |
| 3,800,760 | 4/1974 | Knee | 418/61 A X |
| 3,872,844 | 3/1975 | Gates | 123/90.12 X |

FOREIGN PATENTS OR APPLICATIONS

| | | | |
|---|---|---|---|
| 1,300,123 | 7/1969 | Germany | 123/8.45 |
| 1,962,323 | 6/1971 | Germany | 90.12/ |

*Primary Examiner*—Carlton R. Croyle
*Assistant Examiner*—Michael Koczo, Jr.
*Attorney, Agent, or Firm*—Victor D. Behn; Arthur Frederick

[57] ABSTRACT

An internal combustion engine having an intake port with a valve movable to open and close the intake port and with the duration of the period in which the valve is fully open during each intake phase being varied to regulate the power output of the engine.

5 Claims, 6 Drawing Figures

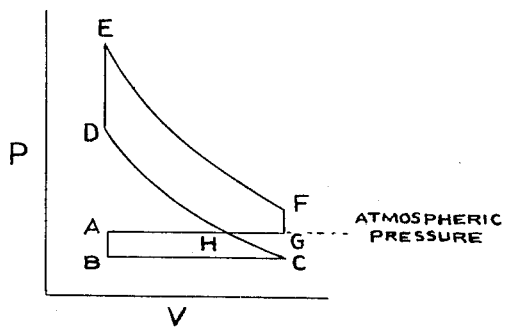
FIG. 2
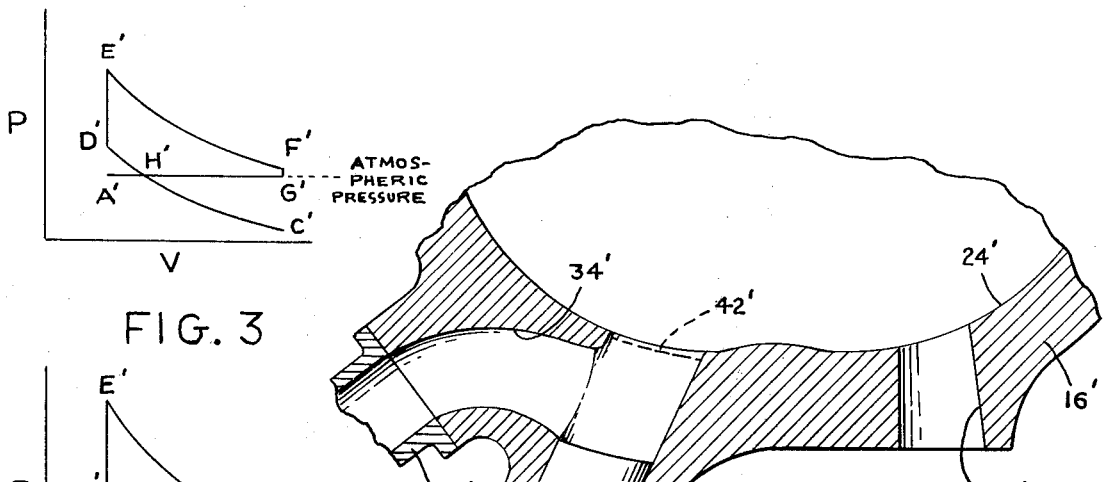
FIG. 3
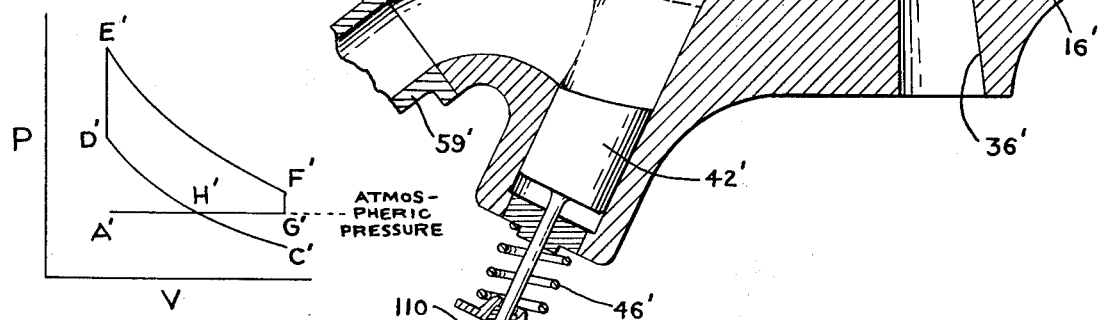
FIG. 4
FIG. 6
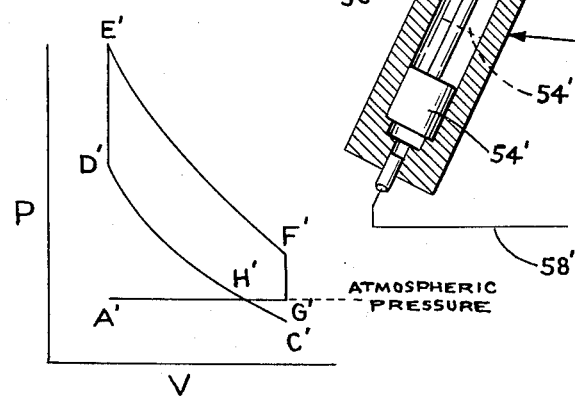
FIG. 5

ROTARY ENGINE WITH INTAKE VALVE HAVING A VARIABLE OPEN PERIOD FOR POWER CONTROL

BACKGROUND

The invention relates to a system or arrangement for controlling the power output of a rotary engine in which the engine cavity has a multi-lobe peripheral profile and a rotor is rotatably supported in the engine cavity for planetary rotation relative to the axis of the engine cavity to form a plurality of working chambers between the rotor and the cavity peripheral profile which vary in volume as the rotor rotates. More specifically, the invention relates to rotary combustion engines of the type (Wankel type) disclosed in U.S. Pat. No. 2,988,065. Such Wankel type rotary engines are provided with intake and exhaust ports which are controlled by the rotor itself so that no separately movable valve elements are required to control the ports. As in the case of conventional reciprocating piston type internal combustion engines, the power output of such a rotary engine generally is controlled by a throttle valve in the intake engine passage leading to the intake port. As a result, when the engine is operating at part load, that is, when the throttle valve is partly closed, there are power losses associated with the pressure drop across the throttle valve.

U.S. Pat. No. 3,762,376 to Eberle discloses a Wankel type rotary combustion engine in which the intake port is provided with means for varying the dimension of the intake port opening in the direction of rotor rotation to vary the power output of the engine so that the engine can be operated without the aforementioned usual throttling losses. In that patent, low engine power outputs are obtained by elongating the intake port opening by means of a slide valve in a side housing of the engine so that a portion of the intake port is still open to a working chamber after the chamber has started its compression phase whereby a portion of the working fluid is pumped back through this portion of the intake port into the intake passage. This arrangement thereby introduces pumping losses into the engine. The construction of the Eberle patent has the further disadvantage in that the intake slide valve must be flush with the intermediate housing in which it is mounted to avoid leakage at the rotor side seals as they cross the slide valve. Also if the intake slide valve is not flush a substantial length of each side seal of the rotor will be unsupported as it crosses the slide valve thereby causing excessive wear of the side seals. This problem in the Eberle patent is accentuated when the intake port slide valve is wide open. Also the Eberle intake slide valve extends into the high pressure region of the engine and therefore must seal tightly in all positions in order to avoid loss of engine compression. Furthermore the intake slide valve in the Eberle patent extends out beyond the engine housing and therefore since it is slidably mounted in the face of the intermediate housing it would interfere with the housing seals usually provided between the rotor and intermediate housing to prevent leakage of the liquid coolant from the engine housing.

SUMMARY OF THE INVENTION

It is an object of the invention to provide a novel rotary engine power control system which avoids the aforementioned problems and in which the usual throttling losses of the engine are minimized thereby decreasing the engine fuel consumption.

More specifically, it is an object of the invention to provide a rotary engine, particularly a rotary combustion engine of the Wankel type, in which the engine intake port is provided with an intake valve which is movable to either a fully open or a fully closed position and in which the valve is controlled so that the duration of the period that the valve is fully open is varied to regulate the power output of the engine.

U.S. Pat. Nos. 2,670,595 and 2,785,667 to Miller both disclose reciprocating piston type internal combustion engines having means for varying the timing of the engine intake valve between fully open and fully closed positions. However, in neither of these patents is the variation in valve timing used to regulate the engine power output. Thus, in both of the Miller patents the engine is supercharged by a supercharger driven by the engine exhaust gases and the timing of the intake valve is varied to compensate for changes in the supercharger pressure with changes in engine power output. U.S. Pat. No. 2,602,434 to Barnaby is another reciprocating piston engine patent disclosing means for varying the timing of the intake valve between a fully open and a fully closed position. Like the Miller patents, however, the Barnaby patent also does not disclose an engine power control system in which the engine power output is controlled by regulating the timing of the intake valve.

In accordance with the invention the intake passage of a rotary engine is provided with a valve disposed adjacent to the engine intake port and valve control means are provided for moving the valve between its fully open and fully closed positions. The valve control means includes means for varying the duration of the period that the valve is fully open to establish the intake phase of each working chamber thereby regulating the power output of the engine. With this arrangement no throttle valve is required in the engine intake passage and, therefore, the usual throttle valve losses are minimized.

Other objects of the invention will become apparent upon reading the annexed detailed description in connection with the drawing.

BRIEF DESCRIPTION OF DRAWINGS

FIG. 2 is an ideal pressure-volume (P-V) diagram of the cyclic pressure volume changes in the working chambers of a conventional rotary combustion engine;

FIGS. 3, 4 and 5 are similar P-V diagrams but of a rotary combustion engine embodying the invention, when the engine is operating on relatively low power, intermediate power and high power respectively; and FIG. 6 is a partial view similar to FIG. 1 but illustrating a modified form of the invention.

DESCRIPTION OF PREFERRED EMBODIMENTS

Figure 1:
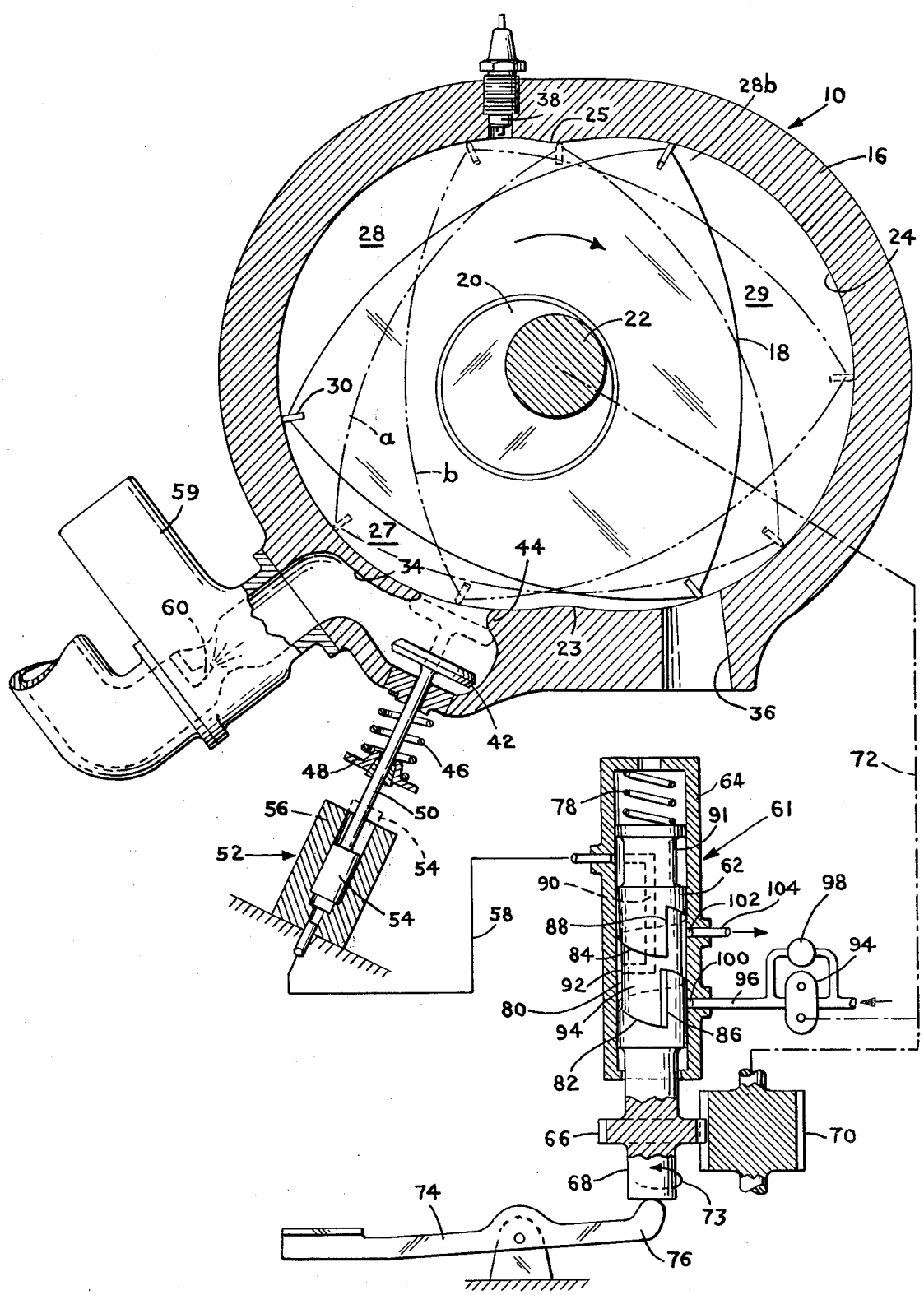
FIG. 1 is a schematic view embodying the invention including a transverse sectional view of the rotary combustion engine.

Referring first to FIG. 1 in the drawing, a rotary combustion engine is schematically indicated at 10. The engine is generally similar to that shown in the aforementioned U.S. Pat. No. 2,988,065. The engine 10 comprises an outer body or housing consisting of two axially spaced end housings 14 (only one of which is shown in the drawings), and an intermediate or rotor housing 16, the housings being secured together to form the engine cavity therebetween. An inner body or rotor 18 is journaled for rotation within said housing cavity on an eccentric portion 20 of a shaft 22 which extends coaxially through and is supported by bearings (not shown) in the end housings 14. The axis of the shaft 22 is perpendicular to the inner walls of said end housings 14.

The peripheral inner surface 24 of the rotor housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 between the rotor and the housings 14 and 16. For this purpose, each of the rotor apex portions is provided with a seal 30 which extends across the rotor between the inner walls of the end housings 14 and the rotor also has suitable seals (not shown) on its end faces for sealing contact with said end housing inner walls. Each of the three peripheral surfaces or working faces of the rotor preferably is provided with a trough-like recess (not shown). The engine also includes an intake passage 34 and an exhaust passage 36 disposed in the engine housing 16 on opposite sides of the lobe junction 23 and a spark plug 38 disposed in the engine housing 16 adjacent to the other lobe junction 25.

The engine structure so far described is conventional and is generally similar to that illustrated in aforementioned prior U.S. Pat. No. 2,988,065. Reference is made to said prior patent for further details of such an engine including, for example, details of the rotor seals and the gearing between the rotor and housing. With such an engine, during engine operation and with the rotor rotating clockwise as viewed in FIG. 1, the volume of each working chamber 28 periodically increases (intake phase) from a minimum volume condition when it is located adjacent to the lobe junction 23 and opens to the intake passage 34, to a maximum volume condition and then said chamber decreases in volume (compression phase) to compress this intake charge until the working chamber again reaches a minimum volume condition, but at this time adjacent the other lobe junction 25. At this point the intake charge is ignited by the spark plug 38. Thereafter the volume of said chamber again increases to a maximum (expansion phase) and then decreases to a minimum (exhaust phase) as the chamber comes into communication with the exhaust port 36 at the lobe junction 23 to complete the four-stroke cycle.

The engine intake passage 34 has a valve 42 movable toward and away from a valve seat 44 disposed close to the trochoid surface 24 for controlling the air and fuel flow into the engine. The valve seat 44 is disposed close to the trochoid surface 24 to minimize the volume between the valve 42, when closed, and the trochoid surface in which exhaust gases could accumulate prior to opening of the valve 42. A spring 46 acts against a collar 48 on the valve stem 50 for urging the valve away from its seat 44 to its open position shown in full lines in the drawing. A hydraulic actuator 52 is provided for moving the valve 42 against the spring 46 into engagement with the valve seat 44 to close the intake passageway 34.

The hydraulic valve actuator 52 is a piston and cylinder assembly consisting of a piston member 54 provided on the end of the valve stem 52 and slidable in hollow cylinder 56. Hydraulic pressure is supplied to the head end of the cylinder 56 by a conduit 58 to exert hydraulic pressure against the valve piston 54 so as to move the valve 42 against its seat 44 (dot and dash line position in FIG. 1) thereby closing the intake passageway 34.

The intake passageway 34 includes a carburetor 59 for supplying fuel through a nozzle 60 to the intake passageway 34 in accordance with the air flow through this passage. The valve 42 thereby serves to control the quantity of air and fuel (that is, combustible mixture), supplied to the engine thereby regulating the engine power output.

A rotary valve mechanism 61 is provided for controlling the timing of a hydraulic fluid pressure, for example oil, through the line 58 to the hollow cylinder 56 within which the piston 54 of the valve stem is slidably disposed. The valve mechanism 61 consists of a continuously rotating valve member 62 which is slidably and rotatably fitted within a cylindrical sleeve 64. A gear 66 is secured to an extension 68 of the valve member and is disposed in meshing engagement with a gear 70 of the same diameter drivably connected to the engine shaft 22 by means schematically indicated at 72. In this way the rotary valve member 62 is continuously rotated within the sleeve 64 by the engine shaft 22 at the same speed as that of said shaft and in the direction (clockwise when viewed from its upper end in FIG. 1) indicated by the arrow 73.

The valve member 62 is also longitudinally slidable within the sleeve 64. A usual engine power control pedal 74 has an extension 76 which is disposed in engagement with the end of an extension 68 of the valve member 62. Depression of the pedal 74 thereby serves to axially raise the rotary valve member 62 (as viewed in the drawing) against a spring 78. As illustrated, the teeth of the gear 70 are relatively long in an axial direction in order that the gears 66 and 70 remain in mesh throughout the range of axial movement of the valve member 62 by the pedal 74. Also a suitable bearing member (not shown) could be interposed between the spring 78 and valve member 62 to facilitate rotation of the valve member relative to the spring.

The rotary valve member 62 has a helical-like recess 80 formed on its outer surface. This recess 80 has lower and upper (as viewed in FIG. 1) helical edges 82 and 84 and extends for approximately one turn about the valve member. In addition, the recess 80 has generally vertical edges 86 and 88 at its ends. Edges 86 and 88 preferably are, as illustrated, vertical and parallel to the axis of the valve member 62. The valve member 62 has an internal passage 90, one end of which communicates with an annular groove 91 disposed adjacent to the upper end of the valve member 62. The passage 58 leading to the valve actuator 52 communicates with annular groove 91, said groove having sufficient axial length to maintain this communication throughout the range of axial movement of the valve member 62 by the pedal 74. The other end of the passage 90 communicates with the recess 80 at one or more points such as 92.

Hydraulic fluid pressure is supplied to the rotary valve mechanism 61 by a pump 94 and conduit 96. The pump 94 preferably is also driven from the engine shaft 22 by the connection schematically indicated at 72. The pump 94 may be provided with a conventional pressure relief valve 98. The conduit 96 is connected to a radial hole or opening 100 in the sleeve 64. The sleeve 64 has a second radial hole 102 axially spaced along the sleeve from the hole 100 a distance approximately equal to the axial width of the helical-like recess 80, said second hole 102 being connected to a drain passage 104.

With the rotary valve 62 in the position shown, the pressure supply opening 100 in the sleeve 64 is covered, that is closed, by the valve member 62 and at the same time the drain opening 102 communicates with the recess 80. Accordingly, in this position of the valve member 62, the conduit 58 leading to the hydraulic actuator 52 is in communication with the drain passage 102 via the valve member passage 90 and the helical recess 80. The valve spring 46 therefore is effective to hold the intake valve 42 in its fully open position as shown by the full line position of the valve 42 in FIG. 1.

When the rotary valve member 62 has rotated clockwise (when viewed from its upper end in FIG. 1) from its position of FIG. 1 to a sufficient extent that the helical edges 82 and 84 move across the holes 100 and 102 respectively, the valve member 62 is then effective to close the hole 102 and to open the hole 100 to the recess 80. Accordingly hydraulic pressure from the hole 100 is now transmitted from the recess 80 through the valve member passage 90 and conduit 58 to the hydraulic actuator 52 to close the intake valve 42 (dot and dash position in FIG. 1).

The end edges 86 and 88 of the recess 80 determine when the intake valve 42 opens to each working chamber 28. Rotation of the valve member 62 is timed in relation to rotation of the rotor so that these edges move across the holes 100 and 102 each time a working chamber is approximately in its minimum volume position adjacent to the lobe junction 23, that is, when the rotor 18 is at its *a* position (illustrated in FIG. 1 by a dot and dash line). When this occurs the rotary valve member 62 closes the hydraulic pressure supply hole 100 and opens the drain hole 102 to the recess 80. Accordingly the valve spring 46 is then effective to open the intake valve 42 and its intake passage 34 to the working chamber 28. In a rotary engine of the type described, the engine shaft 22 rotates at three times the speed of the rotor 18. Accordingly with the rotary valve member 62 rotating at the same speed as that of the engine shaft 22, the rotary valve member is effective to connect the hydraulic valve actuator 52 to the drain passage 102 each time one of the three working chambers 28 is approximately in its minimum volume position adjacent to the lobe junction 23.

The point in each intake phase of a working chamber 28 at which the intake valve 42 is closed to that chamber depends on the vertical position (as viewed in FIG. 1) of the rotary valve 62, that is, to the extent to which the power control pedal 74 has been depressed. As is evident from FIG. 1, as the rotary valve member 62 is raised, further rotary movement of the valve member 62 is required before the helical edges 82 and 84 move across the sleeve holes 100 and 102 respectively to again transmit hydraulic pressure to the valve actuator 52 to close the intake valve 42 to a working chamber. The rotary valve is designed so that at full engine power the intake valve 42 does not close to a working chamber until that chamber has expanded approximately to its maximum extent, that is, when the rotor 18 has reached its *b* position (illustrated in FIG. 1 by a two dot and dash line).

When the power control 74 is set for a lesser or intermediate engine power the rotary valve member 62 is positioned (as illustrated in FIG. 1) at an intermediate position relative to its range of vertical movement by the power control pedal 74 and therefore hydraulic pressure is applied to the hydraulic valve actuator 52 at an earlier point in the intake phase of each working chamber 28. Therefore, when the rotary valve member is in an intermediate power position (as illustrated in FIG. 1) the intake valve 42 closes to each working chamber 28 before that chamber reaches its fully expanded condition. Since the end edges 86 and 88 of the helical recess 80 are parallel to the axis of the rotary valve member 62 the intake valve 42 opens to each working chamber at substantially the same point in its intake phase regardless of the power setting of the rotary valve member 62.

Reference is now made to FIG. 2 which shows an ideal Pressure-Volume (P-V) diagram for each working chamber of a four-stroke cycle internal combustion engine (either piston-type or rotary-type) having a conventional throttle valve in its intake passage for regulating the engine power output. In such an engine with the throttle valve partly closed, line A B C in FIG. 2 represents the intake stroke. As indicated, the pressure immediately drops below atmospheric pressure because of the pressure drop across the throttle valve. The line C H D represents the compression phase, the point H being the point at which this line crosses the atmospheric pressure line. Line D E represents the increase in pressure resulting from combustion. Line E F represents the expansion phase and line F G H A represents the exhaust phase. The area enclosed by the space A B C H is a measure of the cycle loss associated with throttling of the air in the intake passage. As the engine throttle valve is opened to increase the engine power output the pressure drop across its throttle valve decreases and therefore this area A B C H likewise decreases.

FIG. 3 shows an ideal P-V diagram for a working chamber of a rotary engine embodying the invention in which the engine is operated at relatively low power. The points on FIG. 3 corresponding to those on FIG. 2 have been designated by the same but primed reference letters.

In FIG. 3 the intake stroke is now represented by the line A' H' C'. Since the intake stroke starts with the intake valve 42 fully open, the pressure in the intaking working chamber does not drop below the atmospheric pressure line as long as the intake valve remains fully open. At the point H' however the intake valve closes. The mixture in the working chamber now expands along the line H' C' to the end of the intake stroke at C'. The compression stroke now starts and is represented by the line C' H' D'. The initial portion of this line, namely C' H', follows back over the expansion portion H' C' which took place in the intake stroke. The remainder of the working chamber cycle in FIG. 3 is essentially the same as that for a conventional throttle engine. Thus, D' E' represents the rise in pressure occuring on combustion, E' F' represents the expansion phase and F' G' H' A' represents the exhaust phase. It is apparent from FIG. 3 that the area A B C H of FIG. 2 has been eliminated. That is, the engine losses associated with throttling of air in the engine intake passage have been eliminated with applicants' invention.

FIGS. 4 and 5 are similar to FIG. 3 but show the P-V diagram for an intermediate and a higher power setting respectively of the engine. The points on FIGS. 4 and 5 corresponding to those on FIG. 3 have been designated by the same reference letters. The only difference between FIGS. 4 and 5 and FIG. 3 is that with the higher power settings of FIGS. 4 and 5, the intake valve 42 remains open longer and therefore the point H' shifts to the right as viewed in the drawing as the engine power control 74 is set for higher engine powers.

It is apparent from FIGS. 3, 4 and 5 that regardless of whether the engine is set for low or high power operation, the usual throttle losses as represented by the air A B C H in FIG. 2 for an internal combustion engine having a conventional intake throttle valve have been eliminated by this invention.

The maximum pressure difference across the intake valve 42 would be substantially less than that across the intake valve of a reciprocating piston type engine operating at corresponding engine pressures. Accordingly the intake valve 42 of the present invention does not have to close as tightly against its seat to provide an adequate seal as does the intake valve for a reciprocating piston type engine. Furthermore the intake valve in a reciprocating piston type engine is alternately subject to the cool intake temperatures and the hot combustion temperatures whereas the intake valve 42 of the present invention is always subject only to the relatively cool intake temperatures. For these reasons a slide-type of intake valve could be used in the present invention, for example, as illustrated in FIG. 6.

FIG. 6 is a partial view similar to FIG. 1 but illustrating a slide-type of intake valve. For ease of understanding, the parts of FIG. 6 corresponding to the parts of FIG. 1 have been designated by the same, but primed, reference numerals. Since the intake valve 42' does not close against a seat, the actuator cylinder 56 has a flange 110 to limit motion of the valve 42' in a closing direction. In FIG. 2 the valve is shown in its open position by full lines and in its closed position by a dot and dash line. As in the case of the valve 42 of FIG. 1, the valve 42', when closed, is disposed close to the trochoid surface 24'.

As is well known, rotary engines of the type illustrated may have their intake port opening through the trochoidal peripheral surface 24 as illustrated in FIG. 1. This is known as a peripheral port engine. Instead, however, such rotary engines may have their intake ports opening through one of their side housings 14. Such rotary engines are known as side port engines. Both of these types of engines are disclosed in aforementioned prior U.S. Pat. No. 2,988,065. The present invention obviously is applicable to both of these types of rotary engines.

It is not essential to the present invention that the engine fuel be supplied through the intake passage 34 from the carburetor nozzle 60. Thus the engine fuel could be discharged directly into each of the engine working chambers 28 (rather than into the engine intake passage 34) in accordance with the quantity of air supplied through the intake passage 34 to each working chamber 28.

It is also within the scope of the invention to use different means for actuating or moving the intake valve 42 between its open and closed positions. For example, the valve 42 could be moved to its closed position by engine driven cam means with the cam means being adjustable to vary the duration of time the valve 42 is open during each intake phase of a working chamber 28.

It should be understood that this invention is not limited to the specific details of construction and arrangement thereof herein illustrated and that changes and modifications may occur to one skilled in the art without departing from the spirit or scope of the invention.

What is claimed is:

1. A power control system for a four-stroke cycle rotary internal combustion engine having an outer body with an internal cavity, the peripheral surface of which has a multi-lobed profile, the outer body having an intake passage and a combustion gas exhaust passage opening into said cavity and having an inner body of generally polygonal profile mounted for relative rotation within said outer body, the apex portions of said inner body having sealing cooperation with said peripheral surface to define a plurality of working chambers which cyclically vary in volume in response to said relative rotation such that each cycle of a working chamber includes an intake phase in which the volume of the chamber progressively expands, said system comprising:

a. an air intake passageway characterized by the absence of any throttle valve but including valve means movable only to either a fully open or a fully closed position for controlling the quantity of air flow through said intake passageway into the engine working chambers during each intake phase;
   b. valve actuating means for fully opening said valve means to initiate the intake of air into each working chamber approximately at the beginning of the expansion of said chamber and for closing said valve means during said chamber expansion a variable length of time after the valve means has opened thereby controlling the quantity of air supplied to the engine working chambers during each intake phase;
   c. power control means operatively connected to said valve actuating means and manually movable to vary the length of time said valve means is open during each intake phase; and
   d. means for supplying fuel into the engine working chambers in accordance with the air supplied to said chambers so that variation in the length of time the intake valve means is open during each intake phase regulates the power output of the engine.

2. A power control system as claimed in claim 1 and in which said fuel supply means discharges its fuel into said intake passageway.

3. A power control system as claimed in claim 1 and in which said power control means includes a manually movable engine power control member operatively connected to said valve actuating means for increasing the length of time the intake valve is open during each intake phase as the power control member is moved in a power increasing direction.

4. A power control system as claimed in claim 3 and in which said valve actuating means is effective to open the valve means at substantially the same time during each intake phase of a working chamber regardless of the setting of the engine power control member.

5. A power control system as claimed in claim 1 in which said valve actuating means includes a piston and cylinder assembly for moving said valve means from one position to the other upon the application of hydraulic pressure to said assembly and also includes a rotary valve member driven by the engine for controlling the timing of the application of hydraulic pressure to said piston and cylinder assembly and in which said manually movable power control means is operatively connected to said rotary valve member for axially moving said valve member to vary the duration of the application of hydraulic pressure to said piston and cylinder assembly so as to vary the length of time said valve is open during each intake phase.

* * * * *